Figure 1:
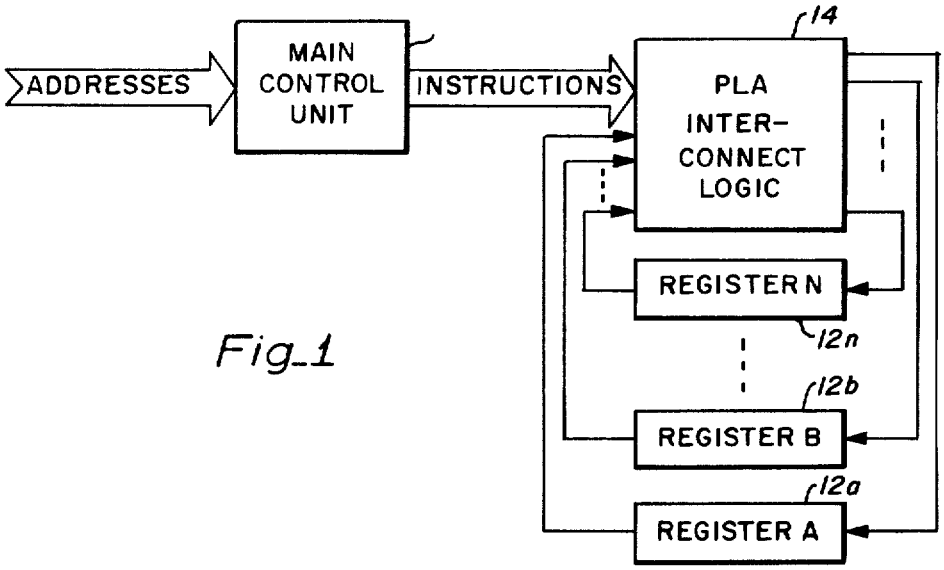
Figure 2:
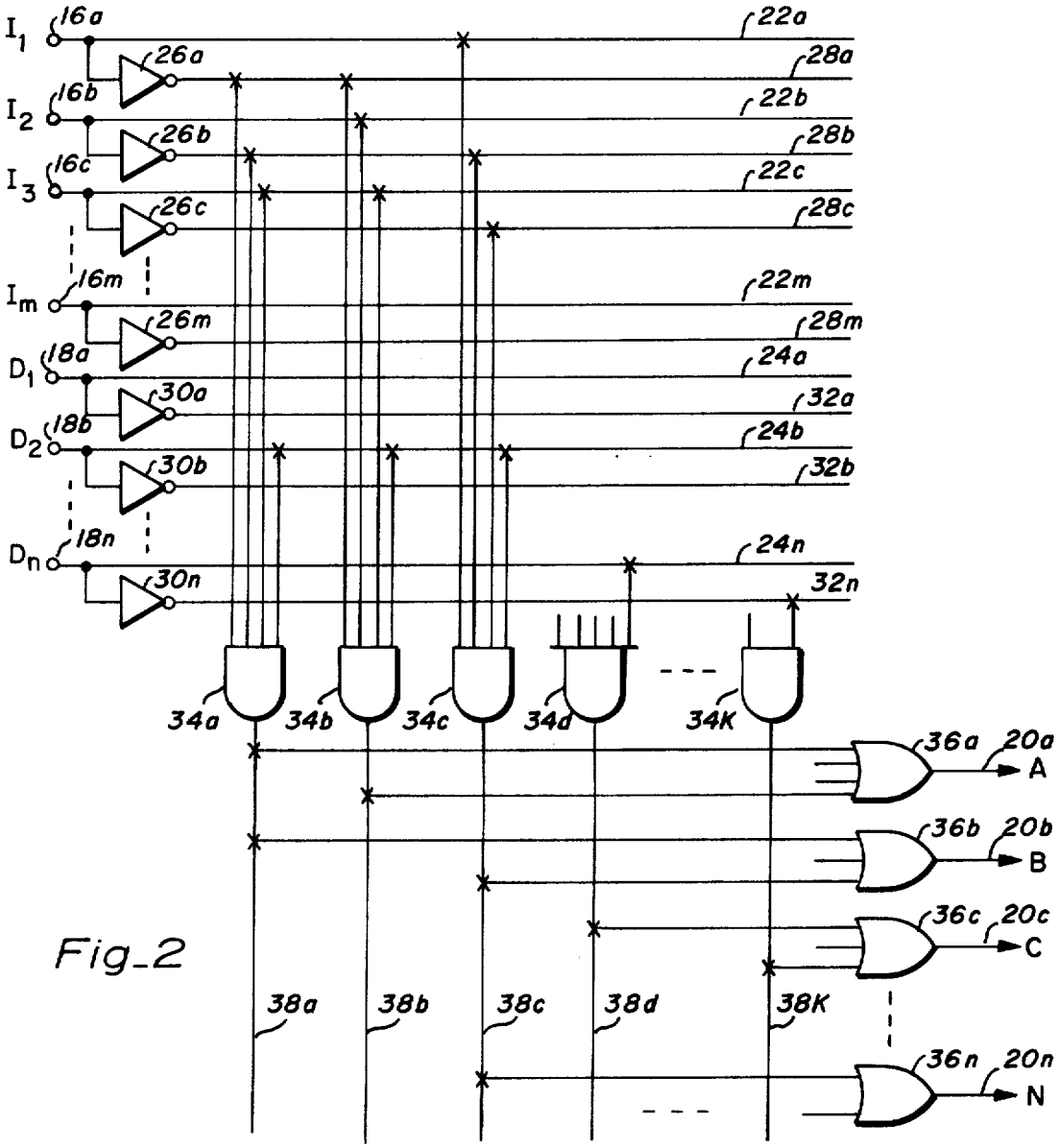

United States Defensive Publication

[19] (H) [11] T956,003

Simone

[43] Mar. 1, 1977

[54] INTERCONNECT LOGIC FOR A SERIAL PROCESSOR

[75] Inventor: Richard B. Simone, Santa Clara, Calif.

[73] Assignee: National Semiconductor Corporation, Santa Clara, Calif.

[21] Appl. No.: 695,675

[22] Filed: June 14, 1976

Related U.S. Application Data

[63] Continuation of Ser. No. 584,637, June 6, 1975, abandoned.

[51] Int. Cl.[2] ..... G06F 9/00

[52] U.S. Cl. ..... 340/172.5

[57] ABSTRACT

The interconnect logic between a main control unit and the data handling register of a serial processor is formed of a programmable logic array (PLA). The serial processor includes a main control unit, a plurality of registers and PLA interconnect logic. The interconnect logic decodes and implements instructions supplied from the main control unit to control the flow of data into and out of the serial registers. The interconnect logic includes a plurality of input terminals $I_1$–$I_m$; $D_1$–$D_n$ and a plurality of output terminals A–N. The input lines are connected to a plurality of lines directly and to another plurality of lines indirectly through inverters. A plurality of AND gates 34 are provided with their inputs connected to various ones of the lines. The outputs of the AND gates are connected to various ones of the inputs to the OR gate 36. If the PLA is made in integrated circuit technology, the selected connections are mask options which are represented in the drawing by an X at each of the connections.

The input terminals $I_1$–$I_m$ are adapted to receive instructions from the main control unit. The input terminals $D_1$–$D_n$ are adapted to receive the outputs of respective ones of the general registers. Accordingly, selected inputs from the instructions supplied by the main control unit are their complements as provided by the inverters and selected inputs from the registers and their complements as provided by the inverters may be connected by mask options to the inputs of any one of the AND gates 34. The output of the AND gates form partial product terms. Selected ones of the partial product terms may therefore be connected by mask options to the inputs of any one of the OR gates 36 to form outputs on the output terminal 20. Thus, the circuit can be used to transfer data between registers and to recirculate data within a register.

1 Claim, 1 Sheet Drawing,

7 Pages Specification

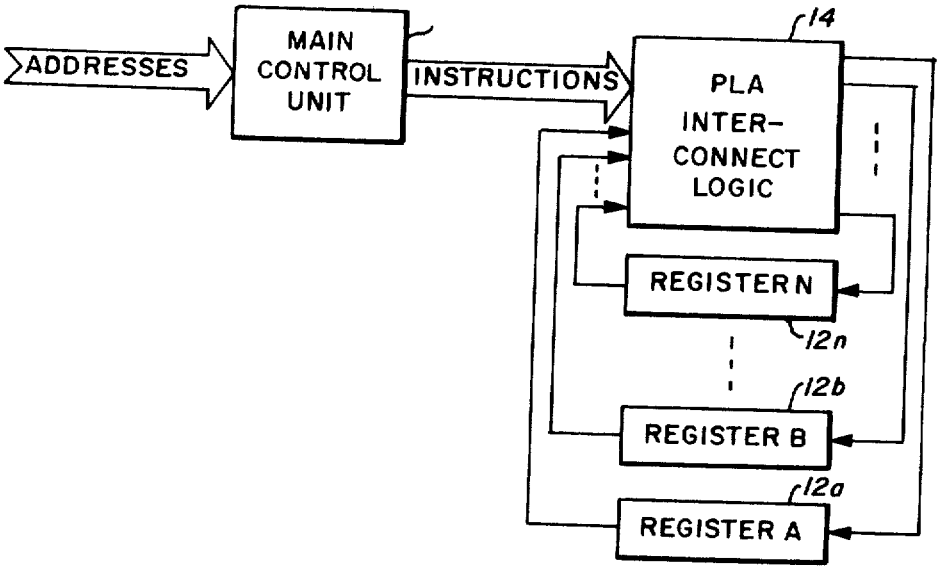

The file of this unexamined application may be inspected and copies thereof may be purchased (849 O.G. 1221, Apr. 9, 1968).